US009784992B2

(12) United States Patent
Spratt et al.

(10) Patent No.: US 9,784,992 B2
(45) Date of Patent: Oct. 10, 2017

(54) METHOD AND SYSTEM FOR DETERMINING AN EYEGLASS PRESCRIPTION

(71) Applicants: Carl Zeiss Vision International GmbH, Aalen (DE); Carl Zeiss Vision Inc., San Diego, CA (US)

(72) Inventors: Ray Steven Spratt, Petaluma, CA (US); Timo Kratzer, Aalen (DE)

(73) Assignees: Carl Zeiss Vision International GmbH, Aalen (DE); Carl Zeiss Vision Inc., San Diego, CA (US)

( * ) Notice: Subject to any disclaimer, the term of this patent is extended or adjusted under 35 U.S.C. 154(b) by 0 days.

(21) Appl. No.: 14/823,714

(22) Filed: Aug. 11, 2015

(65) Prior Publication Data

US 2015/0346512 A1 Dec. 3, 2015

Related U.S. Application Data

(63) Continuation of application No. PCT/US2013/025584, filed on Feb. 11, 2013.

(51) Int. Cl.
*G02C 3/00* (2006.01)
*G02C 7/00* (2006.01)
*G02C 7/02* (2006.01)

(52) U.S. Cl.
CPC ............. *G02C 7/028* (2013.01); *G02C 7/027* (2013.01)

(58) Field of Classification Search
CPC ............. G02C 7/02; G02C 7/027; G02C 7/04
(Continued)

(56) References Cited

U.S. PATENT DOCUMENTS 5,861,935 A * 1/1999 Morris et al. ............ 351/159.42
6,382,795 B1 5/2002 Lai
(Continued)

FOREIGN PATENT DOCUMENTS

| JP | 2012-510642 A | 5/2012 |
| WO | 03/092485 A1 | 11/2003 |
| WO | 2011/131679 A1 | 10/2011 |

OTHER PUBLICATIONS

International Search Report and Written Opinion of the international searching authority dated Nov. 7, 2013 in international patent application PCT/US2013/025584 on which the claim of priority is based.

(Continued)

*Primary Examiner* — James Greece
(74) *Attorney, Agent, or Firm* — Walter Ottesen, P.A.

(57) ABSTRACT

The invention is directed to a method for determining an eyeglass prescription for an eye, in particular through the use of a non-transitory computer readable medium. The method includes the steps of providing a measurement indicative of the refractive properties of the eye; establishing an optimization space corresponding to a plurality of possible eyeglass prescriptions for the eye; determining a merit function, wherein a value of the merit function corresponds to a visual function of the eye when corrected using one of the plurality of possible eyeglass prescriptions within the optimization space, wherein the merit function includes a term depending on a magnitude of a corrective astigmatism of the one of the plurality of possible eyeglass prescriptions and causing a less optimal value of the merit function the higher the magnitude of the corrective astigmatism and/or the higher the magnitude of a difference between the corrective astigmatism and a subjective corrective astigmatism; and determining the eyeglass prescription by optimizing the value of the merit function. The invention is further directed to a (Continued)

system for determining an eyeglass prescription and a corresponding computer program product.

20 Claims, 7 Drawing Sheets

(58) Field of Classification Search
USPC .............................. 351/159.73, 159.76, 246
See application file for complete search history.

(56) References Cited

U.S. PATENT DOCUMENTS

| | | |
|---|---|---|
| 7,857,451 B2 | 12/2010 | Thibos et al. |
| 8,205,987 B2 | 6/2012 | Meister et al. |
| 8,226,230 B2 | 7/2012 | Yamakaji |
| 8,226,238 B2 | 7/2012 | Spratt |
| 8,419,185 B2 | 4/2013 | Liang |
| 8,474,975 B2 | 7/2013 | Yamakaji |
| 8,827,448 B2 | 9/2014 | Liang |
| 9,345,399 B2 | 5/2016 | Liang |
| 2003/0107706 A1* | 6/2003 | Rubinstein et al. .......... 351/177 |
| 2004/0179168 A1* | 9/2004 | Yamakaji ..................... 351/205 |
| 2005/0110946 A1 | 5/2005 | Youssefi et al. |
| 2007/0242221 A1 | 10/2007 | Guilloux et al. |
| 2008/0100800 A1 | 5/2008 | Guillen et al. |
| 2009/0015787 A1 | 1/2009 | Guillen et al. |
| 2010/0039614 A1 | 2/2010 | Morris et al. |
| 2012/0069297 A1 | 3/2012 | Cabeza et al. |

OTHER PUBLICATIONS

Translation and Office action of the Japanese Patent Office dated Jun. 28, 2016 of parallel Japanese application 2015-556917.

English translation and Office action of the Chinese Patent Office dated Jan. 25, 2017 of parallel Chinese patent application 201380072788.0.

* cited by examiner

Fig.7

METHOD AND SYSTEM FOR DETERMINING AN EYEGLASS PRESCRIPTION

CROSS-REFERENCE TO RELATED APPLICATIONS

This is a Continuation application of International patent application PCT/US2013/025584, filed Feb. 11, 2013, designating the United States, the entire content of which is incorporated herein by reference.

BACKGROUND OF THE INVENTION

The disclosure relates to systems and methods for determining an eyeglass prescription, in particular for visual aids.

The ametropic human eye has refractive errors that in first approximation can be described in terms of a sphere, a cylinder and an axis orientation. This is based on the assumption that a visual defect can be approximately corrected through a lens with simple surfaces such as toroids and spheres. This approximation is adequate to correct an error in the refraction of light rays that enter the center of the eye pupil.

While it is customary to determine the refractive errors of the human eye by relying on the subjective refraction of the patient under examination when presenting to him a plurality of optotypes through lenses of different refractive power (so-called subjective refraction or manifest refraction), the possibility of measuring the refractive errors of the eye has now been available for several years (objective refraction). Moreover, it is possible to measure the refractive power of the eye over the entire pupil and, hence, in particular also in the peripheral areas of the pupil. The measurable errors include for example spherical aberration, coma, trefoil error, higher orders of spherical aberration, etc. In certain implementations, the objective refraction method is based on determining the wavefront of a propagating light bundle. The functional principal of a wavefront refractor is described in document U.S. Pat. No. 6,382,795 B1, which is herein incorporated by reference and for which features protection may be sought, and also includes a synopsis of a plurality of different variants.

The refractive errors or imaging errors of the human eye can be mathematically described by means of so-called Zernike polynomials. The errors of the eye near the center of the pupil in regard to sphere, cylinder and axis can be described, for example, through second-order Zernike polynomials. These errors are therefore often referred to as second-order errors. The errors far from the center can be described through higher-order Zernike polynomials. Therefore, these errors are in general referred to as higher-order errors. The information gained from a wavefront refractor can be used in the development of improved vision aids or improved eyesight correction methods. A well known example for an eyesight correction method is the procedure of wavefront-guided refractive surgery. In this procedure, a volume of any desired geometry is removed from the surface of the cornea in order to correct refractive errors, including those of a higher order. In general, in order to determine an eyeglass prescription for visual aids, an eye care professional determines several parameters. In the case of spectacle lenses, for example, the most relevant ones are: refractive values, usually given in form of sphere, cylinder and axis; fitting parameters, such as pupil distance, fitting height, pantoscopic angle and others; and near vision addition, for example, in case of progressive lenses. For contact lenses, the set of parameters usually includes at least the refractive values, similar to spectacle lenses, and corneal curvature.

Conventionally, the determination of refractive values involves the use of subjective refraction techniques. Typically, this is performed by establishing a first set of (sphere, cylinder, axis) values as starting point for an optimization. The starting point can be provided, e.g., through retinoscopy (an autorefractor measurement) through measurement of the currently worn spectacle lenses, or other methods. Then, an iterative optimization process is started, in which different refractive corrections, i.e. sets of (sphere, cylinder, axis) values are offered to the patient, until he/she achieves a maximum of visual acuity on an eye chart. Examples for determining a subjective refraction of an eye are provided in document U.S. Pat. No. 8,226,238 B2 which is herein incorporated by reference and for which features protection may be sought.

Although newer and advanced objective refraction techniques are available, they have not achieved widespread adoption because many eye care professionals are reluctant to change from the tried and trusted subjective refraction.

Further, it has been found that current methods for providing objective refraction techniques lead to eyeglass prescriptions that deviate from the ones found by subjective refraction techniques for the same eye. Of course, it is undesirable to provide an eyeglass prescription determined by objective refraction technique that does not comply with the eyeglass prescription found via subjective refractive techniques and, hence, may not be considered most convenient by the patient.

SUMMARY OF THE INVENTION

Hence, it is an objective of the current invention to provide a system and method for determining an eyeglass prescription of an eye of a patient in an automated manner or via objective refraction techniques that more closely complies with an eyeglass prescription found via subjective refraction techniques.

Hence, according to a first aspect of the current invention, there is provided a method for determining an eyeglass prescription for an eye, in particular through the use of a non-transitory computer readable medium, the method comprising the steps of: providing a measurement, in particular of a wavefront or representing a wavefront, indicative of the refractive properties of the eye; establishing an optimization space corresponding to a plurality of possible eyeglass prescriptions for the eye; determining a merit function, wherein a value of the merit function corresponds to a visual function of the eye when corrected using one of the plurality of possible eyeglass prescriptions within the optimization space, wherein the merit function comprises a term depending on a magnitude of a corrective astigmatism of the one of the plurality of possible eyeglass prescriptions and causing a less optimal value of the merit function the higher the magnitude of the corrective astigmatism and/or the higher the magnitude of a difference between the corrective astigmatism and a subjective corrective astigmatism; and determining the eyeglass prescription by optimizing the value of the merit function.

It has been found that current methods for determining an eyeglass prescription from wavefront aberrations with objective refraction systematically estimate higher magnitude astigmatism correction, on average, compared to a subjective refraction of the same eyes. It has been found that this indicates a systematic error in the objective metrics to determine the best prescription. Hence, the merit function comprises a term depending on a magnitude of a corrective astigmatism of the one of the plurality of possible eyeglass prescriptions and causing a less optimal value of the merit function the higher the magnitude of the corrective astigmatism. Alternatively or additionally, the merit function comprises a term depending on a magnitude of a corrective astigmatism of the one of the plurality of possible eyeglass prescriptions and causing a less optimal value of the merit function the higher the magnitude of a difference between the corrective astigmatism and a subjective corrective astigmatism. The subjective corrective astigmatism may be provided by subjective refraction, in particular subjective refraction techniques commonly known, in particular via an earlier measurement. Alternatively, the subjective refraction may also be provided as a numerical value, in particular a fixed numerical value, in particular in a set of data.

The term "merit function" is well known for a person skilled in the art. A merit function, also known as a figure-of-merit function, is a function that measures the agreement between an optimum and a fitting model—here the visual function—for a particular choice of the parameters. In other words, the merit function evaluates a choice of parameter by providing a value, i.e. the value of the merit function. The merit function may become small when approaching an optimum. However, it may also be designed in a way that it becomes large for a better choice of parameters. During optimization, the parameters are adjusted based on the value of the merit function until an optimum value (either largest or smallest value) is obtained, thus producing a best-fit or optimum with the corresponding parameters giving the optimal value of the merit function.

Hence, it is suggested adding a term to the metrics or merit function which term punishes a potential or possible eyeglass prescription based on the magnitude of its corrective astigmatism, for example expressed by the "cyl" value of the eyeglass prescription. Hence, as will be explained in more detail below, such a modified metric will not only cause a solution with a lesser astigmatism to be preferred in case of two solutions providing the same optimum value for the visual function, but it will also lead to smaller magnitudes of astigmatism—statistically—being prescribed. Hence, the invention takes into account the negative impact of a distortion due to corrective astigmatism on the patient's perception of the best prescription.

Therefore, the basic idea of the invention is to add a term that punishes the metric based on the magnitude of the corrective astigmatism.

The step of providing the measurement indicative of the refractive properties of the eye may be conducted in practice, for example by measurement of a wavefront with a wavefront aberrometer. However, the step of providing the measurement indicative of the refractive properties of the eye may also be conducted simply by providing a data set indicative of the refractive properties of the eye. The data set may then have been acquired previously, in particular at another site, or may have been manually set to represent the refractive properties of a real or fictional eye.

According to a second aspect of the invention, there is provided a method for manufacturing a visual aid, the method comprising the steps of providing a measurement, in particular of a wavefront or representing a wavefront, indicative of the refractive properties of the eye; establishing an optimization space corresponding to a plurality of possible eyeglass prescriptions for the eye; determining a merit function, wherein a value of the merit function corresponds to a visual function of the eye when corrected using one of the plurality of possible eyeglass prescriptions within the optimization space, wherein the merit function comprises a term depending on a magnitude of a corrective astigmatism of the one of the plurality of possible eyeglass prescriptions and causing a less optimal value of the merit function the higher the magnitude of the corrective astigmatism and/or the higher the magnitude of a difference between the corrective astigmatism and a subjective corrective astigmatism; and determining the eyeglass prescription by optimizing the value of the merit function, and manufacturing the visual aid according to the eyeglass prescription.

According to a third aspect of the invention there is provided a system for determining an eyeglass prescription for an eye, comprising a processing unit configured to receive information about a measured wavefront from a wavefront aberrometer, to establish an optimization space corresponding to a plurality of eyeglass prescriptions for the eye, to determine a merit function, wherein a value of the merit function corresponds to a visual function of the eye when corrected using one of the plurality of possible eyeglass prescriptions within the optimization space, wherein the merit function comprises a term depending on a magnitude of a corrective astigmatism of the possible eyeglass prescription and causing a less optimal value of the merit function the higher the magnitude of the corrective astigmatism and/or the higher the magnitude of a difference between the corrective astigmatism and a subjective corrective astigmatism, and to determine the eyeglass prescription by optimizing the value of the merit function.

According to a fourth aspect of the invention, there is provided a, in particular non-transitory, computer program product comprising program code means for carrying out the steps of a method for determining an eyeglass prescription for an eye, in particular through the use of a non-transitory computer readable medium, the method comprising the steps of: providing a measurement, in particular of a wavefront or representing a wavefront, indicative of the refractive properties of the eye; establishing an optimization space corresponding to a plurality of possible eyeglass prescriptions for the eye; determining a merit function, wherein a value of the merit function corresponds to a visual function of the eye when corrected using one of the plurality of possible eyeglass prescriptions within the optimization space, wherein the merit function comprises a term depending on a magnitude of a corrective astigmatism of the one of the plurality of possible eyeglass prescriptions and causing a less optimal value of the merit function the higher the magnitude of the corrective astigmatism and/or the higher the magnitude of a difference between the corrective astigmatism and a subjective corrective astigmatism; and determining the eyeglass prescription by optimizing the value of the merit function, in particular when the computer program product is run on a computer.

The method according to the second aspect of the invention, the system according to the third aspect of the invention and the computer program product according to the fourth aspect of the invention provide the same advantages as the method according to the first aspect of the invention.

In a refinement of the method according to the first aspect, establishing the optimization space comprises defining ranges for one or more parameters characterizing the prescription.

By this, as a result of the optimization process, parameters characterizing the eyeglass prescription can be found directly as a result of the optimization process.

In a further refinement, the one or more parameters characterizing the eyeglass prescription, comprise one or more parameters selected from the group consisting of sphere, cylinder, axis, M, $J_0$ and $J_{45}$. In particular, the parameters may be either sphere, cylinder and axis or may be M, $J_0$ and $J_{45}$.

Of course, further parameters might be possible, for example second-order Zernike polynomials. For example, establishing the optimization space can include defining ranges for one or more parameters characterizing the prescription.

The optimization space can be a single space, such as, for example, a space having three or more dimensions. The three or more dimensions can include sphere, cylinder, and axis or M, $J_0$, and $J_{45}$. In some embodiments, the optimization space comprises two or more sub-spaces. One of the subspaces can include a dimension for sphere. Another one of the subspaces can include a dimension for cylinder and a dimension for axis. In certain embodiments, one of the subspaces can include a dimension for M and another one of the subspaces includes a dimension for $J_0$ and a dimension for $J_{45}$.

Whether the parameters may be set to sphere, cylinder and axis or M, $J_0$, $J_{45}$ or may be even set to the second-order Zernike coefficients, may depend on the visual function used to determine the merit function or any other preference. All parameters or combinations of parameters may be equally used. As a person skilled in the art is readily aware of, a set of parameters comprising sphere, cylinder and axis may be re-calculated to provide a set of parameters comprised of M, $J_0$ and $J_{45}$ by the following equations:

$$M = sph + \frac{1}{2}cyl$$

$$J_0 = -\frac{1}{2}cyl\cos(2\alpha)$$

$$J_{45} = -\frac{1}{2}cyl\sin(2\alpha)$$

wherein $\alpha$ designates the axis, cyl the astigmatism power in diopters and sph the spherical power in diopters. Just the other way around, the following equations may be used to determine the cylinder and axis components out of $J_0$ and $J_{45}$:

$$C = -2\sqrt{J_0^2 + J_{45}^2}$$

$$\alpha = \frac{1}{2}\arctan\left(\frac{J_{45}}{J_0}\right)$$

Further, with the following equations, the second-order Zernike coefficients $C_2^0$, $C_2^{+2}$ and $C_2^{-2}$ can be used as the set of parameters. However, even these Zernike coefficients may be derived from a set of parameters M, $J_0$ and $J_{45}$ with the following equations, wherein $r_p$ is the radius of the pupil:

$$M\langle dpt\rangle = \frac{-4\sqrt{3}}{r_p^2} c_2^0 \langle\mu m\rangle$$

$$J_0\langle dpt\rangle = \frac{-2\sqrt{6}}{r_p^2} c_2^{+2} \langle\mu m\rangle$$

$$J_{45}\langle dpt\rangle = \frac{-2\sqrt{6}}{r_p^2} c_2^{-2} \langle\mu m\rangle$$

In a further refinement, optimizing the value of the merit function comprises iteratively determining a corrected wavefront indicative of the refractive properties of the eye and the corresponding possible eyeglass prescription.

By this, based on each possible eyeglass prescription, the corrected wavefront is determined. Based on the corrected wavefront, a corresponding value of the merit function is calculated. The value of the merit function depends on which visual function of the eye is used to build the merit function and to provide the corresponding values of the merit function.

Different kinds of merit functions and optimization metrics to provide results of objective refraction techniques have been contemplated and are well known to a person skilled in the art. Examples are given for example in document U.S. Pat. No. 7,857,451 B2 "System and method for optimizing clinical optic prescriptions", document US 2012/0069297 A1 "Eyeglass prescription method", US 2005/0110946 A1 "Objective manifest refraction", WO 03/092485 A1 "Sharpness metric for vision quality", US 2008/0100800 A1 "Eyeglass prescription method", US 2009/0015787 A1 "Apparatus and method for determining an eyeglass prescription for a vision defect of an eye" and document U.S. Pat. No. 8,205,987 B2 "Method for optimizing a spectacle lens for the wavefront aberrations of an eye", the disclosure of each of which is incorporated herein by reference and for which features protection may be sought. In case of conflict, the present specification will control.

In a further refinement, the eyeglass prescription is determined by optimizing the value of the merit function to a maximum, and wherein determines a smaller value the higher the magnitude of the corrective astigmatism of the one of the plurality of the possible eyeglass prescriptions.

Alternatively, the eyeglass prescription is generated by optimizing the value of the merit function to a minimum, and wherein the term is a larger value the higher the magnitude of the corrective astigmatism of one of the plurality of the possible eyeglass prescriptions.

Depending on the merit function and depending on the visual function the merit function is describing, the optimum may be either a minimum or a maximum. Correspondingly, the term has to lead into a contrary direction in order to "punish" the optimization process for using a corrective astigmatism with a high magnitude. Hence, in case it is searched for a maximum, the term has to become smaller (or more negative) in case of a higher magnitude of astigmatism. Further, in case it is searched for a minimum, the term has to become larger (or more positive) in case of a higher magnitude of the corrective astigmatism.

In a further refinement of the method according to the first aspect, the visual function is expressed in a unit, wherein the unit is diopters.

By this, it is possible to directly implement the magnitude of the astigmatism into the merit function in a consistent way. For example, the magnitude of the astigmatism can be expressed as the cylinder component of an eyeglass prescription (cyl) and hence, the unit is diopters. Therefore, it would be most consistent if the merit function would also equal a value in diopters.

In a further refinement of the method according to the first aspect of the invention, the visual function is an acuity value of the eye when corrected.

Alternatively, for example the visual function may be a blur value of the eye when corrected.

Possible merit functions using a visual function like the acuity value or the blur value are, for example, suggested in the documents as provided above and are incorporated herein by reference and for which features protection may be sought. Hence, such merit functions without the additional term suggested by the current invention are generally known to a person skilled in the art.

Further, the acuity value and the blur value are expressed in diopters as its unit. Hence, it is possible to directly implement the magnitude of the astigmatism into the merit function.

In a further refinement of the method according to the first aspect of the invention, the term is proportional to the magnitude of the corrective astigmatism.

By this, there can be provided a simple implementation of the magnitude of the corrective astigmatism into the merit function. By way of example, the proportionality constant could be tuned by comparing predicted eyeglass prescriptions determined via objective refraction techniques with results of objective refraction techniques for a large set of measured eyes. Examples for this are further given in the disclosure below.

In a further example, the term may have the form of C·MOA wherein MOA is the magnitude of the corrective astigmatism of one of the plurality of possible eyeglass prescriptions in diopters and C is a proportionality constant of +0.15 or −0.15.

It has been found that such implementation of the term leads to a simple and consistent merit function empirically fully complying with the results of subjective refraction techniques.

In a further refinement, the term may have the form of $$\pm \sum_{i=1}^{n} C_i \cdot MOA^i$$

wherein MOA is the magnitude of the corrective astigmatism of one of the plurality of possible eyeglass prescriptions, n is an order constant and $C_i$ are the coefficients for the respective orders. By such a polynomial, even more complex forms of the term or deviations of objective refraction results can be implemented into a merit function providing an empirical approach to influence the results formed by objective refraction techniques to eyeglass prescriptions found most convenient by patients or wearers.

At a further alternative, the term may have the form of $$\pm C \cdot e^{MOA}$$

wherein MOA is the magnitude of the corrective astigmatism of one of the plurality of possible eyeglass prescriptions, e is the mathematical constant e and C is a proportionality coefficient.

By this, the magnitude of the astigmatism may be punished in a harder overproportional way and, based on statistical analysis, may provide a proper approach taking into account corrections considered inconvenient by wearers.

In a further refinement of the method, the measurement of a wavefront indicative of the refractive properties of the eye is provided by measurement with a wavefront aberrometer.

For example, the wavefront aberrometer can be a Hartmann-Shack sensor, a Tscherning aberrometer, a Talbot aberrometer or double-pass aberrometer.

In a further refinement of the method according to the first aspect of the invention, the method further comprises the step of outputting the eyeglass prescription.

The output device may include an electronic display or a printer. However, the step of outputting may also be conducted by storing the eyeglass prescription on a storing device, in particular a non-transitory storing device, or by transmitting the eyeglass prescription via a data network, in particular to a manufacturing site.

In a further refinement of the method, the step of providing a measurement of a wavefront is conducted at a first site, and wherein the steps of establishing an optimization space, determining a merit function and determining the eyeglass prescription by optimizing the value of the merit function are conducted at a second site remote from the first site, and wherein the provided measurement is transmitted from the first site to the second site via a data network.

By this, the relatively high amount of calculation power may be provided to a multitude of spectacle shops, ophthalmologists etc. Hence, the benefits of the suggested method can be provided more readily to all wearers. The wavefront aberration data provided via the aberrometer can be sent via the data network to the calculation or processing unit. There, the calculation of the optimum eyeglass prescription can be conducted. Then, the result of the determined eyeglass prescription can be sent back to the site where the aberrometer is stationed. Alternatively, the data may be also sent to a third entity or third site where the final spectacle lens is manufactured. Of course, the spectacle lens may also be manufactured at the second site of the calculation unit or at the first site of the aberrometer.

In a further refinement of the system according to the third aspect of the invention, the system further comprises a wavefront aberrometer configured to measure a wavefront indicative of the refractive properties of the eye. Again, the wavefront aberrometer may be a Hartmann-Shack sensor, a Tscherning aberrometer, a Talbot aberrometer or a double-pass aberrometer.

In a further refinement, the wavefront aberrometer is located at a first site, wherein the processing unit is located at a second site, and wherein the first site and the second site are connected via a data network.

As laid out above, this may enable a single processing unit serving a multitude of spectacle shops each having a wavefront aberrometer. Hence, a single second site, wherein the processing unit is located, may be connected via the data network to a multitude of first sites. This avoids the necessary calculation power to be directly situated at each first site or spectacle shop, for example.

In a further refinement, the system comprises an output device configured to output the determined eyeglass prescription.

As already laid out above, the output device may be an electronic display or a printer. Further, the output device may be a storage medium that stores the eyeglass prescription.

It goes without saying that the features mentioned above and the features to follow cannot only be used in the combinations provided but also in different combinations or alone without departing from the scope of the current invention.

BRIEF DESCRIPTION OF THE DRAWINGS

The invention will now be described with reference to the drawings wherein.

DETAILED DESCRIPTION OF THE INVENTION

Figure 1:
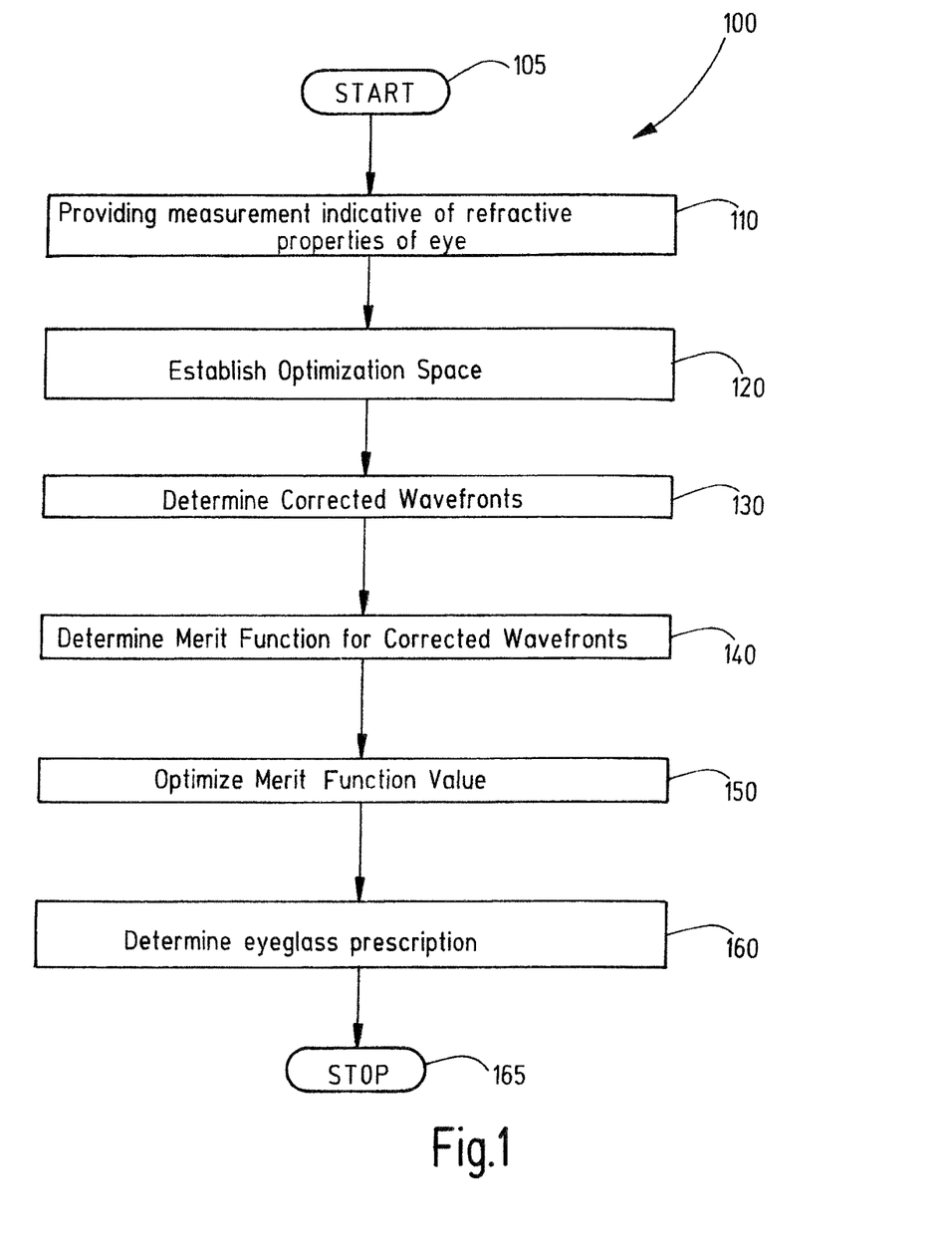
FIG. 1 shows an embodiment of a method for determining an eyeglass prescription for an eye.

Referring to FIG. 1, an embodiment of a method 100 generally includes a number of steps, as illustrated by the flow chart. In a first step, 110, the optical phase error of a patient's eye is measured using an objective method. Typically, this involves measuring a wavefront reflected from the eye using an appropriate sensor. Examples of sensors include various wavefront aberrometers, such as Hartmann-Shack wavefront sensors, Tscherning aberrometers, Talbot aberrometers, and double-pass aberrometers. The functional principal of a wavefront aberrometer is described in U.S. Pat. No. 6,382,795, which also includes a synopsis of a number of different variants.

The measurement data is used as an input for a processing unit, typically including an electronic processor (e.g., a computer). The processing unit establishes a multi-dimensional optimization space (step 120), for which the processing unit calculates a merit function corresponding to, for example, the visual acuity of the eye. The dimensions of the optimization space typically correspond to the sphero-cylindrical corrections characterizing an eyeglass prescription (e.g., sphere, cylinder, and axis). The ranges for each of the dimensions of the optimization space can be set by the eye care professional, or preset by the processing unit. For example, the algorithm for establishing the optimization space can default to a certain range for each dimension, or the default can be over-ridden by the eye care professional based on the professional's experience with the patient. The values for the sphero-cylindrical corrections within each range can be established as desired. For example, each dimension can include a preset number of values (e.g., 10 or more, 100 or more), so that the incremental change between the values is determined by the range. Alternatively, or additionally, the incremental change between the values can be preset, in which case the number of values for each dimension is determined by setting the range. In some embodiments, the values can correspond to stock lens values within the range in each dimension.

As an example, an optimization space can be established based on the patient's pre-existing prescription, where the ranges for sphere and cylinder are set from −5 diopters to +5 diopters about the sphere and cylinder values of the pre-existing prescription. The values can be incremented, for example, by 0.25 diopters within each range.

Typically, the result is an optimization space that is composed of a finite number of (sphere, cylinder, axis) or (mean power ('M'), $J_0$, $J_{45}$) co-ordinates for which a merit function can be evaluated.

In some embodiments, the optimization space is composed of a single space. For example, each point in the optimization space can be a three component vector, e.g., having components corresponding to sphere, cylinder and axis or alternatively the Jackson cylinder components (M, $J_0$, $J_{45}$). In certain embodiments, the optimization space is divided into multiple optimization subspaces, such as two optimization subspaces. For example, each point in the first subspace can be a value for the sphere correction or defocus, and the components of a point in the second subspace can be values for cylinder and axis or the Jackson cylinder components ($J_0$, $J_{45}$). In a third step, in either case, a surface representing the wavefront of the optical correction for each co-ordinate in the optimization space or subspace is created and subtracted from the original wavefront, which yields a series of corrected wavefronts (step 130).

Then in a fourth step, for each of those wavefronts a merit function is calculated (step 140), which correlates with either visual acuity, contrast sensitivity or with another measure of visual performance, or correlates with a combination of those measures of visual performance.

In general, when the optimization space is divided into more than one subspace, the correction for the first subspace (e.g., sphere) should be determined first, and then subtracted from the measured wavefront before determining the correction for the second subspace (e.g., cylinder and axis).

In order to calculate the data, for each point in the optimization space, a corresponding corrected wavefront is calculated. The corrected wavefront is the measured wavefront corrected by the corresponding spherical correction value. Specifically, in certain embodiments, the corrected wavefront is the original wavefront on which, depending on the point in the optimization space, a spherical surface (here referred to as spherical correction value) is added. The shape of this spherical surface at any radial location, r in millimeters, is given by the following equation:

$$SphericalShape = C_2^0 \sqrt{3} \left(2\left(\frac{r}{r_0}\right)^2 - 1\right)$$

where $r_0$ is the pupil radius in millimeters and $$C_2^0 = -\frac{Dr_0^2}{4\sqrt{3}}$$

where D is the point in the sphere power optimization subspace, in diopters.

Then, a merit function value for each of the resulting corrected wavefronts is calculated. In general, merit function values can be calculated in a variety of ways. In certain example embodiments, the merit function may be calculated according to the methods disclosed in U.S. patent application Ser. No. 11/840,688, entitled "APPARATUS AND METHOD FOR DETERMINING AN EYEGLASS PRESCRIPTION FOR A VISION DEFECT OF AN EYE," filed on Aug. 17, 2007 (now published as US 2009/0015787), the entire contents of which are incorporated herein by reference and for which features protection may be sought.

For example, in some embodiments, at least two submetrics can be determined for one of the parameter sets in different stages of the propagation of light through the optical system represented by the eye and an optic corresponding to the eyeglass prescription. In other words, the light passes through the optical system represented by the eye and the optic. One now considers the deviation of the light ray compared to the ideal case, as expressed through a quality metric (submetric), when the light ray has traversed (propagated through) the system represented by the eye and the correction by different travel distances. A propagation in the reverse direction, e.g., directed from the system represented by the eye and the optic towards the object, is likewise conceivable. The propagation being considered here is not tied to a fixed direction through the system represented by the eye and the correction, but can be carried out for any desired number of directions (e.g., in general directions of the line of sight).

These submetrics can include, for example, ray quality metrics such as for example metrics that measure the Strehl ratio or the energy of the point-image washout function enclosed within the Airy disc.

An overall metric which reflects in particular the quality of the caustic ("caustic metric") can be determined from a weighted sum of the previously determined submetrics. In some embodiments, all submetrics are given equal weight in the determination of the overall metric (caustic metric). In certain embodiments, a submetric of a preferred propagation stage is weighted more heavily than the submetrics in the propagation stages before and/or behind this preferred propagation stage. If one uses for example submetrics that take the image quality in different planes into account, then the submetric for the image on the retina (which corresponds to the submetric in the preferred propagation stage) would preferably be given more weight than the submetric for an image before or behind the retina of the eye. The weight ratio could be for example 60/40. Detailed explanation of such an example of possible metrics is given in document US 2010/0039614 A1, the disclosure of which is herein incorporated by reference and for which features protection may be sought.

According to the current invention, the merit function comprises a term that takes into account the magnitude of the corrective astigmatism found in the optimized solution for the eyeglass prescription. Hence, this so-called "punishing term" leads to a less optimal result of the visual function the higher the magnitude of the possible prescription is and/or the higher the magnitude of a difference between the corrective astigmatism and a subjective corrective astigmatism provided by subjective refraction is. The subjective corrective prescription including the subjective corrective astigmatism may be provided as a fixed number or may be been measured via subjective refraction techniques earlier. By this, solutions with lower magnitudes of astigmatism or lower magnitudes of deviations from the subjective corrective astigmatism will be preferred. For example, the visual function may be effective blur and this visual function may become minimized during optimization. Then, the term may be set as being proportional to the magnitude of the corrective astigmatism. Hence, as will be laid out in further details below, the term may be +0.15 times the astigmatism magnitude of the possible eyeglass prescription. All units are diopters and a lower astigmatism solution will, hence, be preferred.

As an example, it may be assumed the merit function is the squared dioptric difference between the measured wavefront's paraxial curvature and the objective prescription. Considering only Zernike aberrations through fourth order such a merit function may be given by $$\text{metric} = \left(m + \frac{c_2^0 4\sqrt{3} - c_4^0 12\sqrt{5}}{r^2}\right)^2 + \left(j_0 + \frac{c_2^2 2\sqrt{6} - c_4^2 6\sqrt{10}}{r^2}\right)^2 + \left(j_{45} + \frac{c_2^{-2} 2\sqrt{6} - c_4^{-2} 6\sqrt{10}}{r^2}\right)^2,$$

where the $c_n^m$ are the Zernike coefficients, r is the pupil radius, and m, $j_0$, and $j_{45}$ are the components of the trial prescription. In this case the optimal prescription components M, $J_0$, and $J_{45}$, are the those which minimize the merit function, and are given by $$M = \frac{-c_2^0 4\sqrt{3} + c_4^0 12\sqrt{5}}{r^2}$$

$$J_0 = \frac{-c_2^2 2\sqrt{6} + c_4^2 6\sqrt{10}}{r^2}$$

$$J_{45} = \frac{-c_2^{-2} 2\sqrt{6} + c_4^{-2} 6\sqrt{10}}{r^2}.$$

An example of a modified merit function, metric', which punishes the magnitude of astigmatism, in particular the departure of the objective cyl from that obtained by a subjective refraction, would be metric'=metric+$k((j_0-J_0)^2+(j_{45}-J_{45})^2)$.

Where $J_0$ and $J_{45}$ are the cyl components of the subjective refraction, and k is a constant that controls the magnitude of the penalty. The cyl components that maximize this new metric, $J'_0$ and $J'_{45}$ are simply given by $$J'_0 = \frac{J_0 + kJ_0}{1+k}$$

$$J'_{45} = \frac{J_{45} + kj_{45}}{1+k}.$$

It shall be noted that for this simple metric the final cyl components are just weighted averages of the components found using the metric and the components from the subjective refraction.

As a numerical example, it may be assumed a patient with a 4 mm pupil diameter having the measured values of a prescription of +1 diopter of sphere with −2 diopters of cyl (minus cyl convention) at 0 degrees, or equivalently M=1.00, $J_0$-1.00, and $J_{45}$=0. Further, $c_2^0$=0.5774, $C_2^2$=0.8165, $C_4^2$=0.0527, and all other Zernike coefficients equal zero. Entering these numbers into the expressions for M, $J_0$, and $J_{45}$ using the metric yields M=1.00, $J_0$=1.25, and $J_{45}$=0. Using the result of the modified metric with k=0.5 gives M'=1.00, $J'_0$=1.17, and $J'_{45}$=0.

In this simple example the modified metric pushes the objectively derived cyl closer to the subjectively prescribed cyl as expected. For more complex merit functions and eye aberrations the extra cyl penalty can also systematically scale down local optima that are far from the prescribed cyl, allowing the algorithm to locate the locally optimal values which are closest to the subjective result.

Last, in step 160, the eyeglass prescription is determined as the result of the optimization process.

Figure 2:
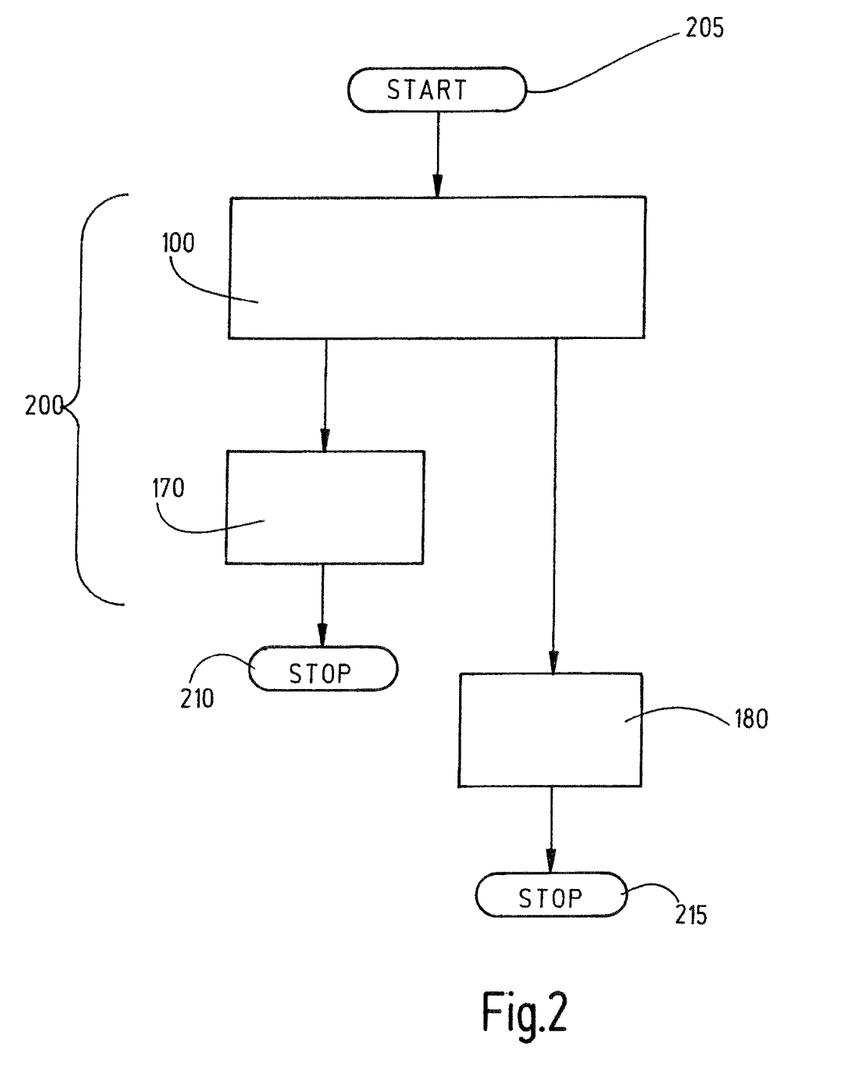
FIG. 2 shows an embodiment of a method for manufacturing a visual aid.

FIG. 2 shows an embodiment of a manufacturing method 200. Such manufacturing method may start in a starting step 205. Then, the method 100 to determine the corresponding eyeglass prescription may be conducted. Then, in a step 170, the visual aid, for example a spectacle lens, may be manufactured. The method then ends in step 210.

Alternatively, after the determination of the eyeglass prescription in step 100, the eyeglass prescription may be outputted in a step 180. The output may be on an electronic display, via a printer or may be an output storing device that stores the eyeglass prescription. The method then ends in a step 215.

Figure 3:
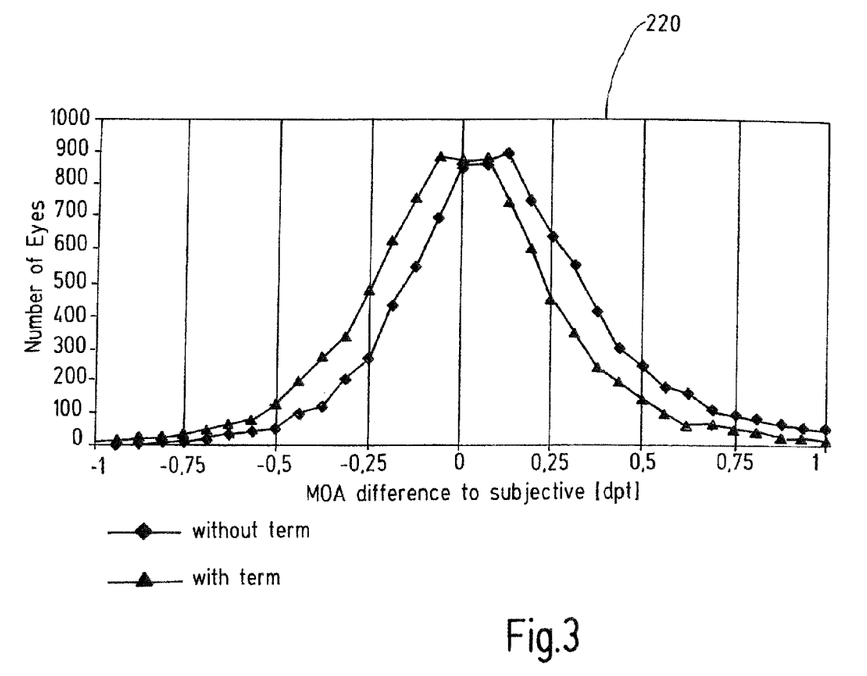
FIG. 3 shows a diagram explaining the advantages of the current invention.

In FIG. 3, the chart 220 shows the distributions of the differences between the calculated astigmatism and the astigmatism prescribed by the subjective refractions for just over 9000 eyes. The "without term" curve represents the differences using known metrics, and the "with term" curve shows the distribution after adding a so-called "rubber band" penalty proportionally based on the magnitude of the astigmatism. In this data set, all eyes whose prescribed astigmatism was exactly zero (about 10% of the original set) were removed, since they would bias the results.

The penalty term was set to 0.15 times the magnitude of the astigmatism. In other words, rather than minimizing the effective blur, it was minimized the blur estimate plus 0.15 times the estimated astigmatism, all in diopters. Hence lower astigmatism solutions were favored.

The median difference to the conventional metric for this data set was 0.11 diopters, the conventional metric having higher astigmatism magnitudes than subjective refraction. With the modified metric the median difference was eliminated; reduced to 0.00. At the same time the width of the distribution was not significantly affected by the shift. The 25 to 75 percentile differences were −0.059 to 0.301 diopters for the conventional metric, for a width of 0.360, while the range was a more symmetric −0.168 to 0.178, for a width of 0.348 diopters for the modified metric.

Figure 4:
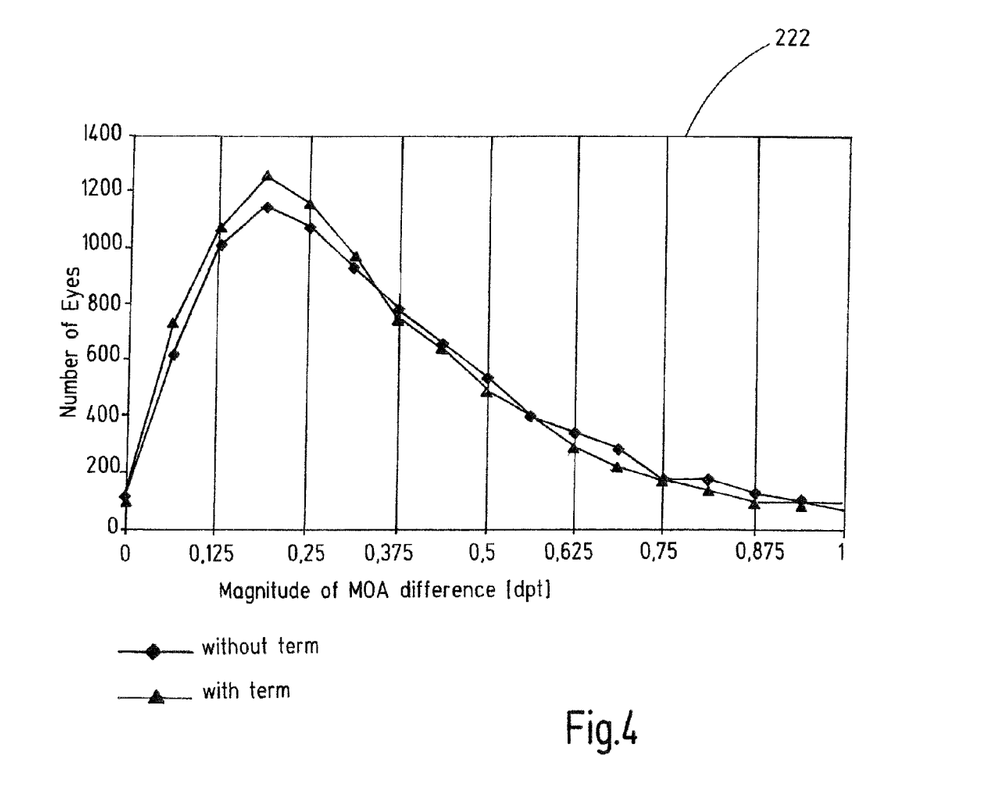
FIG. 4 shows a further diagram explaining the advantages of the current invention.

In FIG. 4, the before and after curves for the magnitude of the astigmatism differences (as apposed to the differences in the cyl magnitudes) are shown. Here the distribution for the modified metric is slightly narrower. For eyes whose cyl moved by more than 0.01 diopters, eyes moving closer to the subjective prescription outnumbered those moving farther away by a ratio of about 2 to 1.

Figure 5:
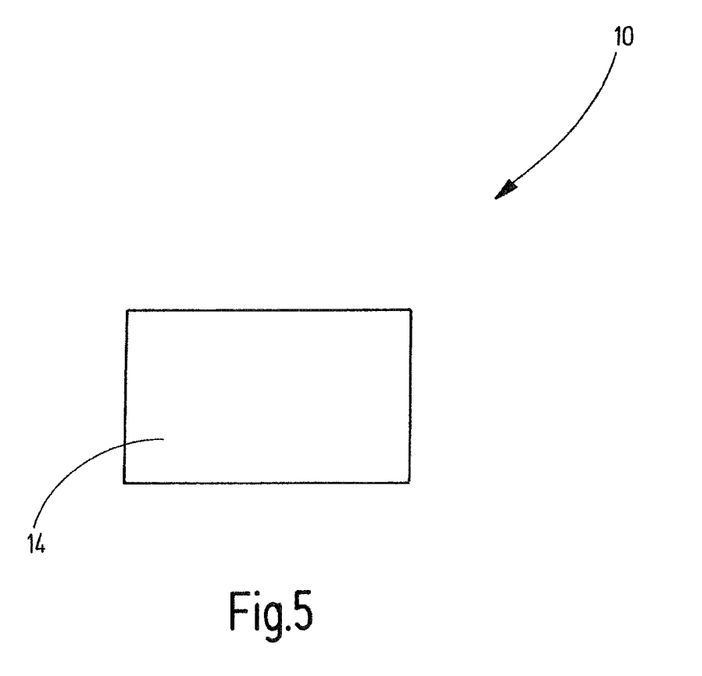
FIG. 5 shows an embodiment of a system.

FIG. 5 shows an embodiment of a system 10 according to the current invention. A system 10 for determining an eyeglass prescription for an eye comprises a processing unit 14 configured to receive information about a measurement indicative of the refractive properties of the eye, to establish an optimization space corresponding to a plurality of eyeglass prescriptions for the eye, to determine a merit function, wherein a value of the merit function corresponds to a visual function of the eye when corrected using one of the plurality of possible eyeglass prescriptions within the optimization space, wherein the merit function comprises a term depending on a magnitude of a corrective astigmatism of the possible eyeglass prescription and causing a less optimal value of the merit function the higher the magnitude of the corrective astigmatism, and to determine the eyeglass prescription by optimizing the value of the merit function.

Figure 6:
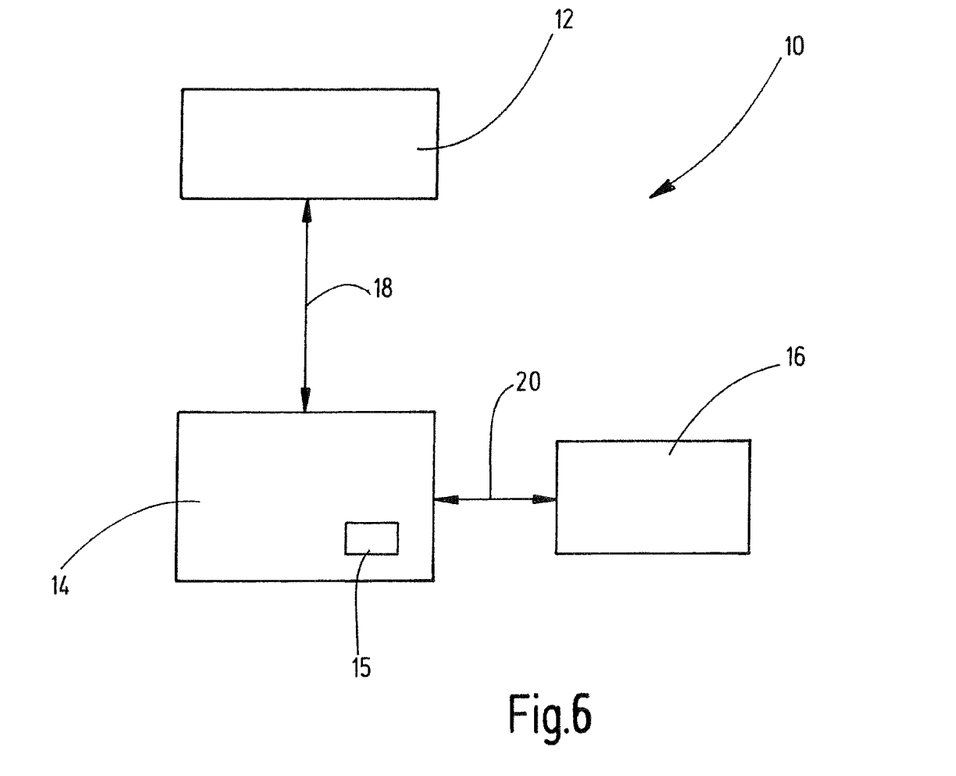
FIG. 6 shows a further embodiment of a system.

FIG. 6 shows a further embodiment of the system 10 according to the current invention. The optical wavefront aberration of a patient's eye of the wavefront aberration can be determined via an aberrometer 12. Further, a subjective refraction may also be determinable. The calculation of the eyeglass prescription is then conducted on the processing unit 14. The processing unit 14 may comprise a computer program product 15 that stores executable program code to execute the methods explained above. Then, the system 10 may further comprise an output device 16 that may be a display, a printer or a storing device to output the determined eyeglass prescription to the output device 16. The aberrometer 12 is connected to the processing unit 14 via a line 18. The processing unit 14 is connected to the output device 16 via a line 20. Both lines 18 and 20 may each be a wired connection or a wireless connection for data transfer between the processing unit 14 from and to the aberrometer 12 and the output device 16.

By this, the system 10 is able to automatically determine an eyeglass prescription based on data provided via an aberrometer. However, instead of an aberrometer 12, the data underlying the optimization process may be also be acquired via the line 18 from a storing device that stores a multitude of patients' data acquired previously.

Figure 7:
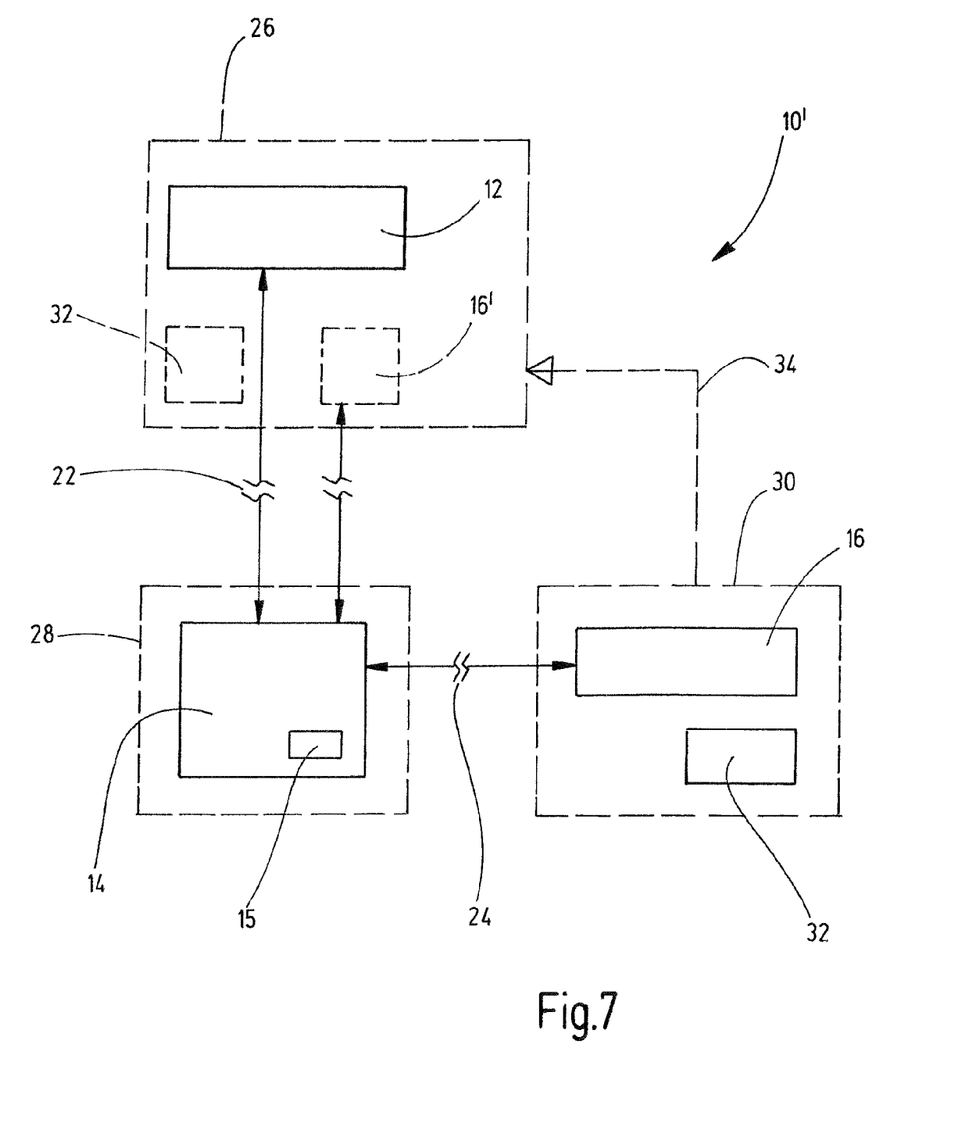
FIG. 7 shows a further embodiment of a system.

In FIG. 7, a further embodiment of the system 10' is shown. The aberrometer 12 may be located at a first site 26. The processing unit 14 is located at a second site 28. The output device 16 may be located at a third site 30 or may be also located at the first site 26. Further, a manufacturing unit 32 from a manufacturing visual aid may be present at either the third site 30 or the first site 26.

The first site 26, the second site 28 and the third site 30 are remote from each other. The first site 26 is connected with the second site 28 via a data network 22. The second site 28 and the third site 30 are connected via a data network 24. By this, it may be possible that refraction data provided via the aberrometer 12 can be sent to the processing unit 14. Further, a subjective refraction, in particular a subjective corrective astigmatism, may also be sent to the processing unit 14, for example from the first site 26 or any other site. Further, for example, the determined eyeglass prescription may then be sent back to the first site, for example a spectacle shop, to be recognized by an ophthalmologist and provided to, for example, the possible wearer. Further, the eyeglass prescription determined can also be forwarded to a remote manufacturing unit to manufacture the respective visual aid. The manufacturing unit can be located at the first site 26. In this case, the data of the aberrometer is transmitted via connection 22 to the processing unit 14 at the second site 28 and then, the calculated eyeglass prescription is transferred back to the first site 26 and its possible manufacturing unit 32. Alternatively, from the second site 28, the determined eyeglass prescription can be transferred to a third site 30 with a possible manufacturing unit 32 to manufacture the visual aid. Last, it is possible that from this third site 30, the manufactured visual aid is then shipped to the first site 26 as indicated by the arrow 34.

While the foregoing discussion refers to implementations for correcting up to second order aberrations, in general, the invention is not limited to second order aberrations. For example, in some embodiments, the methods can be expanded to allow refraction using higher order aberrations. In such cases, the optimization space is expanded by one or more additional dimensions, e.g., for higher order aberrations, such as spherical aberration and/or coma. Such a higher order refraction can then be used by the eyecare professional to specify an ophthalmic correction that includes higher order correction by altering the phase of the incident wavefront in the plane of the pupil according to the prescribed higher order aberration correction.

Furthermore, while the embodiments discussed above are in reference to eye glass visual aids, in general, the techniques can be applied to determining a prescription for contact lenses or refractive surgery as well, which are to be considered as "visual aids". A number of embodiments have been described.

It is understood that the foregoing description is that of the preferred embodiments of the invention and that various changes and modifications may be made thereto without departing from the spirit and scope of the invention as defined in the appended claims.

What is claimed is:

1. A method for determining an eyeglass prescription for an eye, the method comprising the steps of:
   providing a measurement indicative of the refractive properties of the eye;
   establishing an optimization space corresponding to a plurality of possible eyeglass prescriptions for the eye;
   determining a merit function, wherein a value of the merit function corresponds to a visual function of the eye when corrected using one of the plurality of possible eyeglass prescriptions within the optimization space, wherein the merit function comprises a term depending on a magnitude of a corrective astigmatism of the one of the plurality of possible eyeglass prescriptions and causing a less optimal value of the merit function the higher the magnitude of the corrective astigmatism and/or the higher the magnitude of a difference between the corrective astigmatism and a subjective corrective astigmatism; and, determining the eyeglass prescription by optimizing the value of the merit function.

2. The method of claim 1, wherein establishing the optimization space comprises defining ranges for one or more parameters characterizing the eyeglass prescription.

3. The method of claim 1, wherein optimizing the value of the merit function comprises iteratively determining a corrected wavefront indicative of the refractive properties of the eye and the corresponding possible eyeglass prescription.

4. The method of claim 1, wherein the eyeglass prescription is determined either by optimizing the value of the merit function to a maximum, and wherein the term has a smaller value the higher the magnitude of the corrective astigmatism of one of the plurality of the possible eyeglass prescriptions, or by optimizing the value of the merit function to a minimum, and wherein the term has a larger value the higher the magnitude of the corrective astigmatism of one of the plurality of the possible eyeglass prescriptions.

5. The method of claim 1, wherein the visual function is an acuity value of the eye when corrected or a blur value of the eye when corrected.

6. The method according to claim 1, wherein the term is proportional to the magnitude of the corrective astigmatism.

7. The method of claim 1, wherein the term has the form of $$\pm \sum_{i=1}^{n} C_i \cdot MOA^i$$

wherein MOA is the magnitude of the corrective astigmatism of one of the plurality of possible eyeglass prescriptions, n is an order constant and $C_i$ are the coefficients for the respective orders.

8. The method of claim 1, wherein the term has the form of $$\pm C \cdot e^{MOA}$$

wherein MOA is the magnitude of the corrective astigmatism of one of the plurality of possible eyeglass prescriptions, e is the mathematical constant e and C is a proportionality coefficient.

9. The method of claim 1, the method further comprising the step of outputting the eyeglass prescription.

10. The method of claim 1, wherein the step of providing a measurement is conducted at a first site, and wherein the steps of establishing an optimization space, determining a merit function and determining the eyeglass prescription by optimizing the value of the merit function are conducted at a second site remote from the first site, and wherein the provided measurement is transmitted from the first site to the second site via a data network.

11. The method according to claim 1, wherein the method is for determining an eyeglass prescription for an eye through the use of a non-transitory computer readable medium.

12. A method for manufacturing a visual aid, the method comprising the steps of:

determining an eyeglass prescription according to the following steps:
providing a measurement indicative of the refractive properties of the eye;
establishing an optimization space corresponding to a plurality of possible eyeglass prescriptions for the eye;
determining a merit function, wherein a value of the merit function corresponds to a visual function of the eye when corrected using one of the plurality of possible eyeglass prescriptions within the optimization space, wherein the merit function comprises a term depending on a magnitude of a corrective astigmatism of the one of the plurality of possible eyeglass prescriptions and causing a less optimal value of the merit function the higher the magnitude of the corrective astigmatism and/or the higher the magnitude of a difference between the corrective astigmatism and a subjective corrective astigmatism; and,
determining the eyeglass prescription by optimizing the value of the merit function; and,
the method further comprising:
manufacturing the visual aid according to the eyeglass prescription.

13. A system for determining an eyeglass prescription for an eye, comprising a processing unit configured to receive information about a measurement indicative of the refractive properties of the eye, to establish an optimization space corresponding to a plurality of eyeglass prescriptions for the eye, to determine a merit function, wherein a value of the merit function corresponds to a visual function of the eye when corrected using one of the plurality of possible eyeglass prescriptions within the optimization space, wherein the merit function comprises a term depending on a magnitude of a corrective astigmatism of the possible eyeglass prescription and causing a less optimal value of the merit function the higher the magnitude of the corrective astigmatism and/or the higher the magnitude of a difference between the corrective astigmatism and a subjective corrective astigmatism, and to determine the eyeglass prescription by optimizing the value of the merit function.

14. The system of claim 13, wherein the system further comprises an output device configured to output the determined eyeglass prescription.

15. The system of claim 13 further comprising a wavefront aberrometer located at a first site, wherein the processing unit is located at a second site, and wherein the first site and the second site are connected via a data network.

16. The system of claim 15, wherein the system further comprises an output device configured to output the determined eyeglass prescription.

17. A non-transitory computer program product comprising program code means for carrying out the steps of a method for determining an eyeglass prescription for an eye, the method comprising the steps of:

providing a measurement indicative of the refractive properties of the eye;
establishing an optimization space corresponding to a plurality of possible eyeglass prescriptions for the eye;
determining a merit function, wherein a value of the merit function corresponds to a visual function of the eye when corrected using one of the plurality of possible eyeglass prescriptions within the optimization space, wherein the merit function comprises a term depending on a magnitude of a corrective astigmatism of the one of the plurality of possible eyeglass prescriptions and causing a less optimal value of the merit function the higher the magnitude of the corrective astigmatism and/or the higher the magnitude of a difference between the corrective astigmatism and a subjective corrective astigmatism; and, determining the eyeglass prescription by optimizing the value of the merit function.

18. The non-transitory computer program product of claim 17, wherein the program code means are for carrying out the steps of the method when the computer program product is run on a computer or processing unit.

19. The method of claim 1, wherein said term depending on a magnitude of a corrective astigmatism is a punishing term.

20. The system of claim 13, wherein said term depending on a magnitude of a corrective astigmatism is a punishing term.

* * * * *